(12) United States Patent
Kang et al.

(10) Patent No.: US 8,487,773 B2
(45) Date of Patent: Jul. 16, 2013

(54) CRIME PREVENTION SYSTEM USING HUMAN BODY COMMUNICATION AND CRIME PREVENTION METHOD USING HUMAN BODY COMMUNICATION

(75) Inventors: Tae Wook Kang, Daejeon (KR); Sung Weon Kang, Daejeon (KR); Jung Hwan Hwang, Daejeon (KR); Tae Young Kang, Daejeon (KR); Kyung Soo Kim, Daejeon (KR); Sung Eun Kim, Seoul (KR); Jung Bum Kim, Daejeon (KR); Kyung Hwan Park, Daejeon (KR); Hyung Il Park, Daejeon (KR); In Gi Lim, Daejeon (KR); Byoung Gun Choi, Daegu (KR); Seok Bong Hyun, Daejeon (KR); Chang Hee Hyoung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 426 days.

(21) Appl. No.: 12/950,975

(22) Filed: Nov. 19, 2010

(65) Prior Publication Data
US 2011/0148640 A1   Jun. 23, 2011

(30) Foreign Application Priority Data

Dec. 22, 2009   (KR) .................. 10-2009-0129264
May 13, 2010   (KR) .................. 10-2010-0044925

(51) Int. Cl.
*G08B 23/00*   (2006.01)
(52) U.S. Cl.
USPC ............. 340/573.1; 340/573.4; 340/539.12; 340/539.26; 340/539.32; 340/568.1; 700/300; 700/468; 700/517

(58) Field of Classification Search
USPC ............ 340/573.1, 573.4, 539.12, 539.26, 340/539.62, 568.1; 701/300, 468, 517
See application file for complete search history.

(56) References Cited

U.S. PATENT DOCUMENTS

| 5,196,825 | A  | * | 3/1993 | Young ...................... 340/539.11 |
| 6,563,427 | B2 | * | 5/2003 | Bero et al. ................. 340/573.1 |
| 6,889,135 | B2 | * | 5/2005 | Curatolo et al. .............. 701/468 |
| 7,602,303 | B2 |   | 10/2009 | Douglas et al. |

FOREIGN PATENT DOCUMENTS

| KR | 10-2006-0027157 A | 3/2006 |
| KR | 10-2009-0112366 A | 10/2009 |

* cited by examiner

*Primary Examiner* — Tai T Nguyen

(57) ABSTRACT

Disclosed are a crime prevention system using human body communication and a crime prevention method using human body communication capable of actively and effectively preventing a generation of a crime by using human body communication. The crime prevention system using human body communication includes: a monitoring device attached to a monitoring target to sense his physical contact with an observer and providing information obtained by monitoring the monitoring target through human body communication when body contact of the monitoring target with the observer is sensed; and a reception device attached to the observer, receiving the monitoring information through human body communication, and transmitting the monitoring information to a pre-set destination. A criminal act of the monitoring target may be prevented in advance, and when a criminal act is attempted, an observer who may fall a victim of the criminal act can actively cope with the situation.

17 Claims, 4 Drawing Sheets

CRIME PREVENTION SYSTEM USING HUMAN BODY COMMUNICATION AND CRIME PREVENTION METHOD USING HUMAN BODY COMMUNICATION

CROSS-REFERENCE TO RELATED APPLICATIONS

This application claims the priority of Korean Patent Application Nos. 10-2009-0129264 filed on Dec. 22, 2009, and 10-2010-0044925 filed on May 13, 2010, in the Korean Intellectual Property Office, the disclosures of which are incorporated herein by reference.

BACKGROUND OF THE INVENTION

1. Field of the Invention

The present invention relates to a crime prevention technique and, more particularly, to a crime prevention system using human body communication and a crime prevention method using human body communication capable of actively and effectively preventing a generation of a crime by using human body communication.

2. Description of the Related Art

As society advances and becomes more complicated, the occurrence of crimes such as kidnapping, violence, abduction, sexual assaults increases, so efforts for preventing crimes are being made in various ways.

For example, in order to prevent crimes targeting children, parents are urged to accompany their children to go to or return from school and children are intensively educated not to follow a strange person in schools and homes, but without much effect. Also, a method of installing a CCTV for monitoring an area having a high crime rate or a high possibility of crime rate is employed; however, in order to prevent crimes by means of CCTVs, a large number of CCTVs must be installed, and in general, because CCTVs are fixedly installed, a blind spot is inevitably generated, making it difficult to completely prevent crimes.

In addition, a method of attaching an electronic monitoring device to monitoring targets (i.e., monitoring subjects) (i.e., targets or subjects to be monitored) such as sexual assault ex-convicts or the like to monitor them for the purpose of preventing sexual assaults is also in use, but such a method ends up in simply collecting location information or body information of the monitoring targets. Thus, when a monitoring target attempts crime, a victim as a target of the crime cannot be aware of the identity or criminal record of the monitoring target, and for a monitoring target who does not have any criminal intent, controversy exists over violation of human rights of the monitoring target.

SUMMARY OF THE INVENTION

An aspect of the present invention provides a crime prevention system using human body communication capable of actively and effectively preventing crimes by using human body communication.

Another aspect of the present invention provides a crime prevention method using human body communication capable of actively and effectively preventing crimes by using human body communication.

Technical tasks of the present invention are not limited to those described above, and other technical tasks not mentioned may be clearly understood by a person skilled in the art from the following description.

According to an aspect of the present invention, there is provided a crime prevention system using human body communication, including: a monitoring device attached to a monitoring target to sense his physical contact with an observer and providing information obtained by monitoring the monitoring target through human body communication when body contact (or physical contact) of the monitoring target with the observer is sensed; and a reception device attached to the observer, receiving the monitoring information through human body communication, and transmitting the monitoring information to a pre-set destination.

The monitoring device may transmit a monitoring signal for sensing body contact with the monitoring target's body, and sense body contact based on a signal in response to the transmitted monitoring signal.

When body contact is sensed, the monitoring device may output a warning signal to the monitoring target.

The monitoring information may include at least one of location information of the monitoring target, body contact time, personal information regarding the monitoring target, and biometric information of the monitoring target.

The monitoring device may include: a first human body communication unit providing the monitoring information to the reception device through human body communication; a location detection unit detecting a current location of the monitoring device; a first controller determining whether or not there has been body contact and providing control to transmit the monitoring information to the pre-set destination; and a first wireless communication unit transmitting the monitoring information to the pre-set destination under the control of the first controller.

The monitoring device may further include: a biometric signal detection unit detecting a biometric signal of the monitoring target; and a first warning signal output unit outputting a warning signal according to control signal from the first controller.

The reception device may transmit the monitoring information to a mobile terminal of the observer by using a short range wireless communication technique.

The reception device may transmit the monitoring information to the pre-set destination by using a mobile communication technique.

When the reception device receives the monitoring information, it outputs a warning signal.

The reception device may include: a second human body communication unit receiving the monitoring information provided from the monitoring device through human body communication; a second controller providing control to transmit the monitoring information to the pre-set destination, when the monitoring information is received; and a second wireless communication unit transmitting the monitoring information to the pre-set destination under the control of the second controller.

The crime prevention system may further include: a central control device receiving the monitoring information from at least one of the monitoring device and the reception device, and transmitting the monitoring information to a destination corresponding to the received monitoring information.

The central control device may include: a third controller detecting a destination address corresponding to the received monitoring information and providing control to transmit the monitoring information to the detected destination address; a third communication unit transmitting the monitoring information to the destination address by using a wired or wireless interface under the control of the third controller; and a database including the destination address corresponding to the monitoring information.

According to another aspect of the present invention, there is provided a crime prevention method using human body communication of a system including a monitoring device attached to a monitoring target, a reception device attached to an observer, not the monitoring target, and a central control device receiving data from the monitoring device and the reception device, including: determining, by the monitoring device, whether or not the monitoring target comes into contact with the observer's body; when the body contact is generated, transmitting, by the monitoring device, monitoring information to the reception device and the central control device through human body communication; transmitting, by the reception device, the received monitoring information to at least one of a mobile terminal of the observer and the central control device; and receiving, by the central control device, the monitoring information from at least one of the monitoring device and the reception device, and transmitting the monitoring information to a destination corresponding to the received monitoring information.

The determining, by the monitoring device, of whether or not the monitoring target comes into contact with the observer's body may include: transmitting, by the monitoring device, a monitoring signal for detecting body contact with the monitoring target's body; and detecting body contact based on a signal received in response to the monitoring signal.

The crime prevention method may further include: when it is determined that body contact has happened, outputting, by at least one of the monitoring device and the reception device, a warning signal.

The monitoring information may include at least one of location information of the monitoring target, body contact time, personal information regarding the monitoring target, and biometric information of the monitoring target.

The receiving, by the central control device, of the monitoring information from at least one of the monitoring device and the reception device and transmitting the monitoring information to a destination corresponding to the received monitoring information may include: reading, by the central control device, a destination address corresponding to the received monitoring information from a database; and transmitting the monitoring information to the read destination address.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
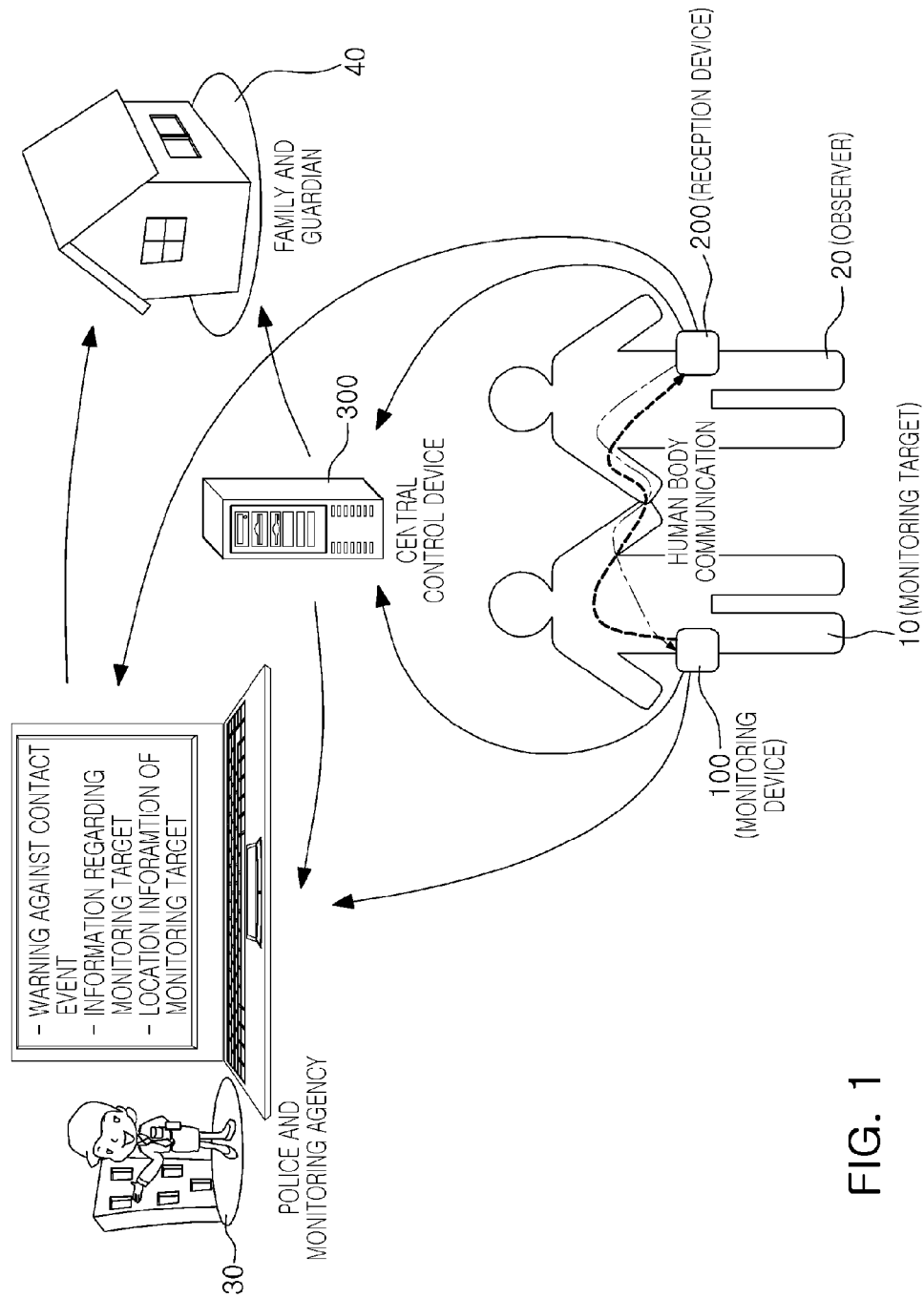
FIG. 1 is a conceptual view showing a crime prevention system using human body communication according to an exemplary embodiment of the present invention.

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted.

Hereinafter, human body communication used in exemplary embodiments of the present invention refers to a communication technique of transmitting and receiving data by using a human body as a communication channel, and any human body communication method using a human body as a communication channel, including a method of using a change in current flowing across in the human body and a method using a change in a surface electric field of a human body, can be applicable to the present invention.

FIG. 1 is a conceptual view showing a crime prevention system using human body communication according to an exemplary embodiment of the present invention.

With reference to FIG. 1, a crime prevention system using human body communication according to an exemplary embodiment of the present invention may include a monitoring device 100 attached to a monitoring target 10 who is highly likely to commit a crime, a reception device 200 detachably attached to an observer 20 such as a woman, a child, or an elderly person, who may become a victim of a criminal act of the monitoring target 10, and a central control device 300 receiving monitoring information from at least one of the monitoring device 100 and the reception device 200, and processing the received monitoring information according to a predetermined method.

When the monitoring target 10 and the observer 20 are in physical contact with each other, the monitoring device 100 attached to the monitoring target 10 and the reception device attached to the observer 20 perform human body communication to transmit and receive information.

In detail, the monitoring device 100, which includes information regarding the monitoring target, transmits a signal for monitoring whether or not the monitoring target is in physical contact with the observer to the monitoring target's body. When the monitoring device 100 determines that the monitoring target is in physical contact with the observer, the monitoring device 100 provides a signal notifying about the body contact and information regarding the monitoring target (e.g., the name, age, a criminal record, etc.) to the reception device through human body communication. At the same time, the monitoring device 100 transmits body information such as the pulse rate, or the like, of the monitoring target 10, monitoring information regarding a current location of the monitoring target, and the like, to the central control device 300.

Also, when the monitoring device determines that the monitoring target 10 and the observer 20 are in physical contact, it may warn the monitoring target 10 of the physical contact through a warning message, an alarm sound, or a light emitting diode.

When the monitoring target 10 and the observer 20 are in physical contact, the reception device 200 receives information regarding the monitoring target 10 from the monitoring device 100 through human body communication, processes the received information, and notifies the observer 20 about a dangerous situation.

Here, the reception device 200 may warn the mobile terminal (e.g., a mobile phone, a PDA, and the like) of the observer 20 of the dangerous situation by using a short range wireless communication technique or a mobile communication technique, so that the observer 20 can recognize the dangerous situation to positively react to it.

Also, with the occurrence of the physical contact, the reception device 200 may transmit a warning signal to the monitoring device 100 through human body communication, or may directly transmit the contact fact and the information regarding the monitoring target 10 based on the information provided from the central control device 300 and the monitoring device 100.

When the warning information is provided from at least one of the monitoring device 100 and the reception device 200, the central control device 300 analyzes the received monitoring information and transmits the same to a predetermined destination. Here, the destination to which the central control device 300 transmits the warning information may be, for example, a police or monitoring agency 30 device or a device such as a mobile phone, a computer, and the like, carried by a family member or guardian (or patron) 40 of the observer around.

When the police or the monitoring agency 30 receives the monitoring information from the central control device 300, it may analyze the received monitoring information and take action corresponding to the situation, or may provide the monitoring information to the family member or the guardian 40 of the person.

Also, the family member or the guardian 40 of the observer may take action for the security and safety of the observer 20 according to the monitoring information provided from the central control device 300 and/or the police or the monitoring agency 30.

The central control device 300 illustrated in FIG. 1 may be installed in a mobile carrier, police, or a monitoring agency in consideration of a crime prevention policy, efficiency, and the like.

Figure 2:
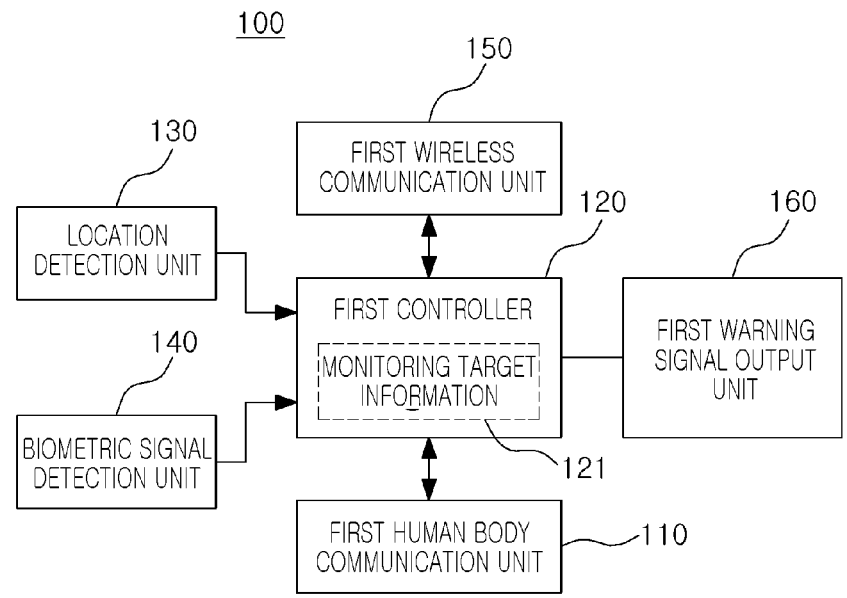
FIG. 2 is a block diagram showing a detailed structure of a monitoring device illustrated in FIG. 1.

FIG. 2 is a block diagram showing a detailed structure of the monitoring device illustrated in FIG. 1.

With reference to FIG. 2, the monitoring device 100 may include a first human body communication unit 110, a first controller 120, a location detection unit 130, a biometric signal detection unit 140, a first wireless communication unit 150, and a first warning signal output unit 160.

The first human body communication unit 110 transmits a warning signal for monitoring body contact through the monitoring target's body under the control of the first controller 120, and when the first human body communication unit 110 detects a signal received in response thereto is detected, it provides an event signal indicating that a detection signal or a signal has been detected to the first controller 120.

In addition, the human body communication unit 110 provides information regarding the monitoring target to the reception device 200 through human body communication under the control of the first controller 120.

The first controller 120, which may include the information 121 regarding the monitoring target, determines whether or not body contact has happened based on the detection signal or the detection event signal provided from the first human body communication unit 110. When the first controller 120 determines that body contact has happened, the first controller 120 reads personal information regarding the monitoring target and then transmits the read personal information to the reception device 200 through the first human body communication unit 110.

At the same time, the first controller 120 transmits the fact of body contact, body contact time, the location of the monitoring target, biometric information of the monitoring target, and personal information regarding the monitoring target (e.g., name, age, address, criminal record, etc.) to the central control device 300 through the first wireless communication unit 150.

In addition, when the first controller 110 determines that body contact has happened or when a body contact warning signal is provided from the reception device 200, the first controller 110 controls the first warning signal output unit 160 to output a warning message, an alarm sound, or a warning light, to warn the monitoring target 10 of the occurrence of body contact, thereby preventing crime.

The location detection unit 130 may be configured as, for example, a GPS reception module, and it receives a GPS signal and provides the same to the first controller 120. Besides the GPS reception module, various other known techniques that can track the location may be applicable as the location detection unit 130.

The biometric signal detection unit 140 may include devices for measuring a biometric signal such as pulsation, blood pressure, body temperature, and the like, of the monitoring target, and provides the measured biometric signal to the first controller 120.

The first wireless communication unit 150 may be implemented by a short-range wireless communication technique such as Bluetooth™, ZigBee™, ultra-wide band (UWB), and the like, or it may be implemented by a mobile communication technique such as HSPA, WiBro, and the like, for long-range wireless communication. The first wireless communication unit 150 processes the transmission signal provided from the first controller 120 according to a wireless communication protocol, and then transmits the processed signal to a predetermined destination. A message transmitted by the first wireless communication unit 150 may have, for example, an SMS form.

The first warning signal output unit 160 may be configured as a speaker, a warning light, a display element, and the like, and outputs a warning signal according to a control signal from the first controller 120.

Figure 3:
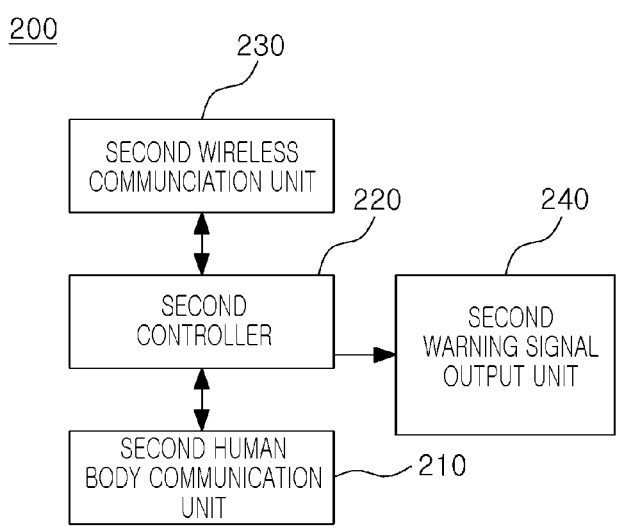
FIG. 3 is a block diagram showing a detailed structure of a reception device illustrated in FIG. 1.

FIG. 3 is a block diagram showing a detailed structure of the reception device illustrated in FIG. 1.

With reference to FIG. 3, the reception device 200 may include a second human body communication unit 210, a second controller 220, a second wireless communication unit 230, and a second warning signal output unit 240.

When a warning signal for monitoring body contact is provided from the monitoring device 100, the second human body communication unit 210 transmits a response signal, and when monitoring information of the monitoring target is provided from the monitoring device 100, the second human body communication unit 210 processes the provided monitoring information and provides the processed monitoring information to the second controller 220.

Also, the second human body communication unit 210 may provide body contact warning signal to the monitoring device 100 under the control of the second controller 220.

When the second controller 220 receives the monitoring information provided from the monitoring device 100 through the second human body communication unit 210, the second controller 220 transmits the monitoring information to a pre-set destination through the second wireless communication unit.

In addition, when the monitoring information is provided, the second controller 220 may control the second warning signal output unit 240 to output a warning signal.

The second wireless communication unit may be implemented by a short-range wireless communication technique such as Bluetooth™, ZigBee™, ultra-wide band (UWB), and the like, to transmit the monitoring information of the monitoring target to a portable device held by the observer, or it may be implemented by a mobile communication technique such as HSPA, WiBro, and the like, for long-range wireless communication to transmit the monitoring information to a predetermined destination located at a remote area. Here, when the second wireless communication unit 230 is implemented by a mobile communication technique, a message transmitted by the second wireless communication unit 230 may be an SMS form and include previously stored personal information regarding the observer.

The second warning signal output unit 240 may be configured as a speaker, a warning light, a display element, a vibration element, and the like, and outputs a warning signal according to a control signal from the second controller 220.

Figure 4:
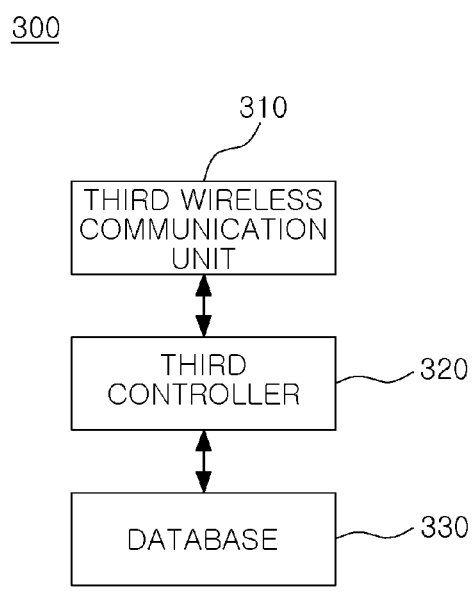
FIG. 4 is a block diagram showing a detailed structure of a central control device illustrated in FIG. 1.

FIG. 4 is a block diagram showing a detailed structure of the central control device illustrated in FIG. 1.

With reference to FIG. 4, the central control device according to an exemplary embodiment of the present invention includes a third wireless communication unit 310, a third controller 320, and a database 330.

The third wireless communication unit 310 may be implemented by a mobile communication technique such as HSPA, WiBro, or the like, or a wired communication technique such as Ethernet or the like. The third wireless communication unit 310 receives the monitoring information provided from the monitoring device 100 and/or the reception device 200, processes the received monitoring information, and then provides the processed monitoring information to the third controller 320.

The third controller 320 analyzes the provided monitoring information to acquire the information regarding the monitoring target, reads a corresponding destination address from the database 330, and transmits the monitoring information to the read destination address.

In addition, when the received monitoring information includes the information regarding the observer, the third controller 320 may read a destination address corresponding to the information regarding the observer from the database 330 and then transmit the monitoring information to the read destination address.

The database 330 includes information such as information regarding the monitoring target, a destination address to which the monitoring information is to be transmitted according to the information regarding the monitoring target. In addition, the database 330 may include personal information regarding previously registered observers, destination addresses of the registered observers to which monitoring information is to be transmitted, and the like.

Figure 5:
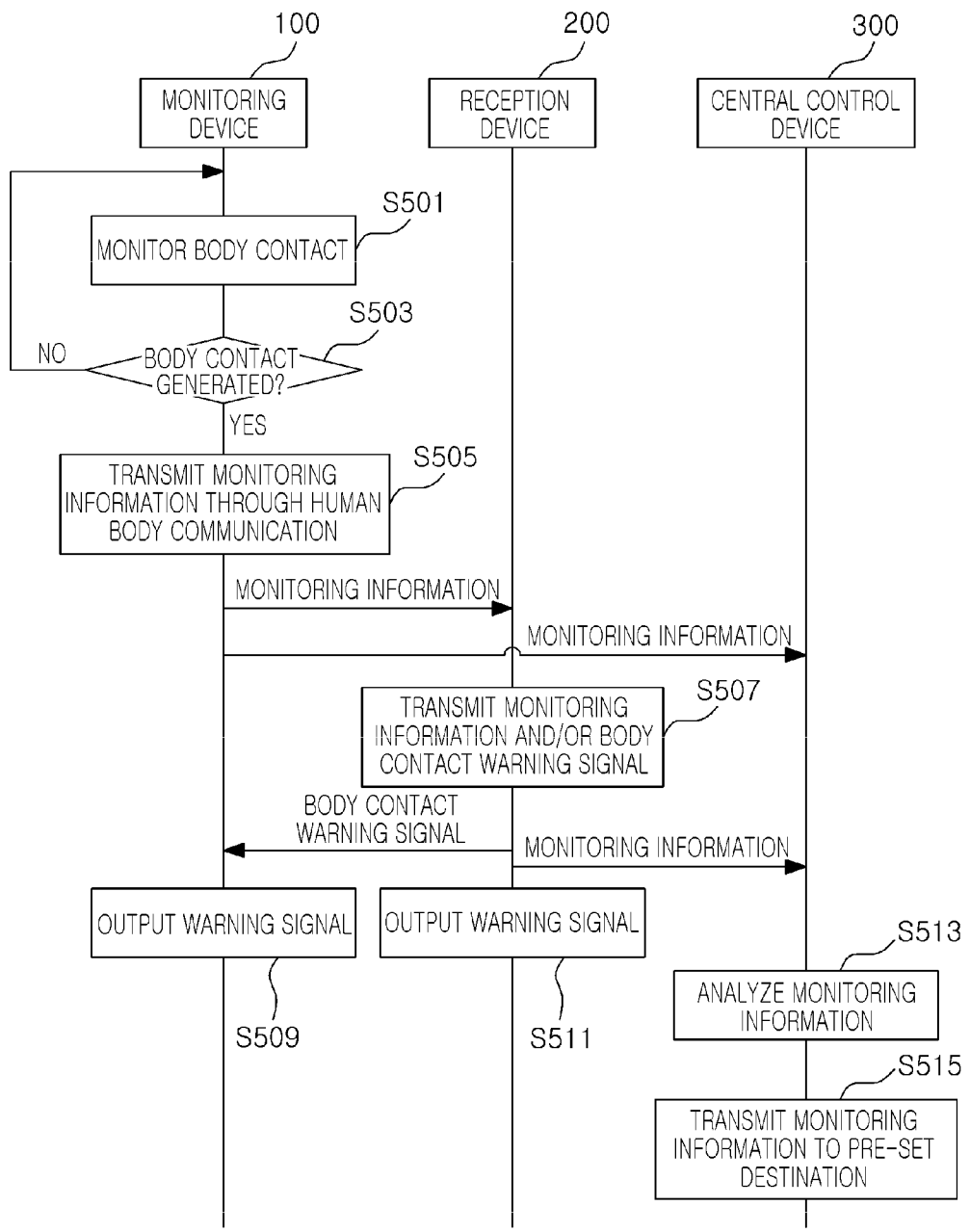
FIG. 5 is a flow chart illustrating the process of a crime prevention method using human body communication according to an exemplary embodiment of the present invention.

FIG. 5 is a flow chart illustrating the process of a crime prevention method using human body communication according to an exemplary embodiment of the present invention.

The crime prevention method using human body communication according to an exemplary embodiment of the present invention will now be described with reference to FIG. 5. First, the monitoring device 100 monitors physical contact between the monitoring target and the observer (S501) and determines whether or not they come into physical contact with each other (S503). Here, the monitoring and determining whether or not the monitoring target and the observer come into physical contact with each other may be performed by transmitting, by the monitoring device 100, a body contact monitoring signal through the monitoring target's body and determining whether or not there is a response signal.

When the monitoring device 100 determines that the monitoring target comes into physical contact with the observer, the monitoring device 100 transmits monitoring information to the reception device 200 and the central control device 300 through human body communication (S505). Here, the transmitted monitoring information may include at least one of information of the fact of body contact, body contact time, the location of the monitoring target, biographical information of the monitoring target, and personal information regarding the monitoring target (e.g., name, age, address, criminal record, etc.).

When the reception device 200 receives the monitoring information from the monitoring device 100, it transmits the received monitoring information to a mobile terminal held by the observer and/or the central control device 300 so that the observer can recognize the information regarding the monitoring target and actively cope with a dangerous situation, and the reception device 200 transmits a body contact warning signal (S507). The reception device 200 may be configured to directly transmit the monitoring information or an emergency situation notification message including the monitoring information to a pre-set destination.

The monitoring device 100 and the reception device 200 outputs a warning signal with respect to body contact, respectively (S509, S511). Here, the warning signal with respect to body contact may be performed in various manners such as a voice, an alarm sound, a message, vibration, and the like.

Also, it may be configured such that only one of the monitoring device 100 and the reception device 200 outputs a warning signal.

The central control device 300 analyzes the monitoring information received from the monitoring device 100 and/or the reception device 200 (S513), and transmits the received monitoring information to a destination address corresponding to the analyzed monitoring information (S515).

As set forth above, in the crime prevention system using human body communication and the crime prevention method using human body communication according to exemplary embodiments of the invention, because the monitoring device attached to the monitoring target and the reception device attached to a person bi-directionally communicate through human body communication, when body contact happens, the person can recognize personal details and an approach intention of the monitoring target, and thus, the person can actively cope with a dangerous situation.

Also, because monitoring information transferred to the reception device through human body communication is transmitted to the central control device in real time and the central control device transmits the received monitoring information to police or a monitoring agency, a pre-set destination, a crime type of the monitoring target can be compared and analyzed, and a determination can be quickly and effectively made based on the analyzed content.

In addition, when body contact happens, a warning signal is output through the monitoring device attached to the monitoring target and the reception device of the person, a criminal impulse can be restrained, and thus, crime can be prevented.

Moreover, because the monitoring device and the reception device are used based on human body communication, infringements into the rights of a monitoring target who does not intend to commit a crime can be reduced as compared with the related art crime prevention method.

Furthermore, because whether or not body contact happens is monitored by using human body communication consuming less power, an energy usage efficiency is higher than that of the related art crime prevention devices.

While the present invention has been shown and described in connection with the exemplary embodiments, it will be apparent to those skilled in the art that modifications and variations can be made without departing from the spirit and scope of the invention as defined by the appended claims.

What is claimed is:

1. A crime prevention system using human body communication, the system comprising:
    a monitoring device attached to a monitoring target to sense his physical contact with an observer and providing information obtained by monitoring the monitoring target through human body communication when body contact of the monitoring target with the observer is sensed; and
    a reception device attached to the observer, receiving the monitoring information through human body communication, and transmitting the monitoring information to a pre-set destination.
2. The system of claim 1, wherein the monitoring device transmits a monitoring signal for sensing body contact with the monitoring target's body, and senses body contact based on a signal in response to the transmitted monitoring signal.
3. The system of claim 1, wherein when body contact is sensed, the monitoring device outputs a warning signal to the monitoring target.
4. The system of claim 1, wherein the monitoring information comprises at least one of location information of the monitoring target, body contact time, personal information regarding the monitoring target, and biographical information regarding the monitoring target.
5. The system of claim 1, wherein the monitoring device comprises:
    a first human body communication unit providing the monitoring information to the reception device through human body communication;
    a location detection unit detecting a current location of the monitoring device;
    a first controller determining whether or not there has been body contact and providing control to transmit the monitoring information to the pre-set destination; and
    a first wireless communication unit transmitting the monitoring information to the pre-set destination under the control of the first controller.
6. The system of claim 5, wherein the monitoring device further comprises:
    a biometric signal detection unit detecting a biometric signal of the monitoring target; and
    a first warning signal output unit outputting a warning signal according to control signal from the first controller.
7. The system of claim 1, wherein the reception device transmits the monitoring information to a mobile terminal of the observer by using a short range wireless communication technique.
8. The system of claim 1, wherein the reception device transmits the monitoring information to the pre-set destination by using a mobile communication technique.
9. The system of claim 1, wherein when the reception device receives the monitoring information, it outputs a warning signal.
10. The system of claim 1, wherein the reception device comprises:
    a second human body communication unit receiving the monitoring information provided from the monitoring device through human body communication;
    a second controller providing control to transmit the monitoring information to the pre-set destination, when the monitoring information is received; and
    a second wireless communication unit transmitting the monitoring information to the pre-set destination under the control of the second controller.
11. The system of claim 1, further comprising:
    a central control device receiving the monitoring information from at least one of the monitoring device and the reception device, and transmitting the monitoring information to a destination corresponding to the received monitoring information.
12. The system of claim 11, wherein the central control device comprises:
    a third controller detecting a destination address corresponding to the received monitoring information and providing control to transmit the monitoring information to the detected destination address;
    a third communication unit transmitting the monitoring information to the destination address by using a wired or wireless interface under the control of the third controller; and
    a database including the destination address corresponding to the monitoring information.
13. A crime prevention method using human body communication of a system including a monitoring device attached to a monitoring target, a reception device attached to an observer, not the monitoring target, and a central control device receiving data from the monitoring device and the reception device, the method comprising:

determining, by the monitoring device, whether or not the monitoring target comes into contact with the observer's body;

when the body contact is generated, transmitting, by the monitoring device, monitoring information to the reception device and the central control device through human body communication;

transmitting, by the reception device, the received monitoring information to at least one of a mobile terminal of the observer and the central control device; and receiving, by the central control device, the monitoring information from at least one of the monitoring device and the reception device, and transmitting the monitoring information to a destination corresponding to the received monitoring information.

14. The method of claim 13, wherein the determining, by the monitoring device, of whether or not the monitoring target comes into contact with the observer's body comprises:

transmitting, by the monitoring device, a monitoring signal for detecting body contact with the monitoring target's body; and detecting body contact based on a signal received in response to the monitoring signal.

15. The method of claim 13, further comprising:

when it is determined that body contact has happened, outputting, by at least one of the monitoring device and the reception device, a warning signal.

16. The method of claim 13, wherein the monitoring information comprises at least one of location information of the monitoring target, body contact time, personal information regarding the monitoring target, and biographical information regarding the monitoring target.

17. The method of claim 13, wherein the receiving, by the central control device, the monitoring information from at least one of the monitoring device and the reception device and transmitting the monitoring information to a destination corresponding to the received monitoring information comprises:

reading, by the central control device, a destination address corresponding to the received monitoring information from a database; and transmitting the monitoring information to the read destination address.

* * * * *